(12) United States Patent
Yoo et al.

(10) Patent No.: US 6,285,646 B1
(45) Date of Patent: *Sep. 4, 2001

(54) OPTICAL PICKUP USING OBJECTIVE LENS COMPATIBLE WITH A PLURALITY OF OPTICAL DISKS

(75) Inventors: Jang-Hoon Yoo, Seoul; Yong-Jae Lee, Suwon; Pyong-Yong Seong; Chul-Woo Lee, both of Seoul, all of (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,451

(22) Filed: Nov. 24, 1998

(30) Foreign Application Priority Data

Dec. 5, 1997 (KR) ................................. 97-66390

(51) Int. Cl.$^7$ ....................................... G11B 7/00
(52) U.S. Cl. ....................................... 369/112.26
(58) Field of Search ................ 369/112, 44.23, 369/44.24, 110, 109, 94

(56) References Cited

U.S. PATENT DOCUMENTS

| | | | |
|---|---|---|---|
| 5,844,879 | * 12/1998 | Morita et al. | 369/44.23 |
| 5,883,747 | * 3/1999 | Yamazaki et al. | 369/112 |
| 5,883,873 | * 3/1999 | Morita | 369/112 |
| 5,903,536 | * 5/1999 | Lee et al. | 369/112 |
| 5,926,450 | * 7/1999 | Braat | 369/112 |
| 5,933,401 | * 8/1999 | Lee et al. | 369/112 |
| 5,986,993 | * 11/1999 | Yoo et al. | 369/112 |
| 6,023,450 | * 2/2000 | Park et al. | 369/112 |
| 6,091,691 | * 7/2000 | Yoo et al. | 369/110 |

FOREIGN PATENT DOCUMENTS

| | | |
|---|---|---|
| 0 805 440 A1 | 11/1997 | (EP) . |
| 0 807 928 A2 | 11/1997 | (EP) . |
| 0 838 812 A2 | 4/1998 | (EP) . |
| 0 859 356 | 8/1998 | (EP) . |
| 0 865 037 A1 | 9/1998 | (EP) . |
| 2 744 831 | 8/1997 | (FR) . |
| 9-145995 | 6/1997 | (JP) . |
| 9-184975 | 7/1997 | (JP) . |
| 9-237431 | 9/1997 | (JP) . |
| 10-255305 | 9/1998 | (JP) . |

* cited by examiner

*Primary Examiner*—Nabil Hindi
(74) *Attorney, Agent, or Firm*—Staas & Halsey LLP

(57) ABSTRACT

An optical pickup device including an objective lens which is compatible with a plurality of optical disks of respectively different specifications, such as a digital versatile disk (DVD), a compact disk-recordable (CD-R) medium, a compact disk (CD) and a laser disk (LD). The optical pickup device includes a laser source to emit light, an objective lens to focus the light emitted from the laser source on respective information recording surfaces of a plurality of optical recording media as an optimal optical spot, and an optical detector to detect light reflected from the information recording surface of the optical recording medium on which the optical spot has been focused and transmitted through the objective lens. The objective lens includes a first lens area, a second lens area, and a third lens area to focus the light emitted from the laser source. The first lens area has an aspherical surface corresponding to a first optical recording medium and a second optical recording medium, the second lens area has an aspherical surface corresponding to the second optical recording medium, and the third lens area has an aspherical surface corresponding to the first optical recording medium. As a result, the optical pickup can be compatible with a plurality of the optical disks of a respectively different specification irrespective of the thickness of the disk.

24 Claims, 5 Drawing Sheets

OPTICAL PICKUP USING OBJECTIVE LENS COMPATIBLE WITH A PLURALITY OF OPTICAL DISKS

CROSS-REFERENCE TO RELATED APPLICATIONS

This application claims the benefit of Korean Application No. 97-66390, filed Dec. 5, 1997 in the Korean Patent Office, the disclosure of which is incorporated herein by reference.

BACKGROUND OF THE INVENTION

1. Field of the Invention

The present invention relates to an optical pickup device that forms an optical spot on an information recording surface of optical recording media having different specifications, such as disk thickness and use wavelength, and more particularly, to an optical pickup device that includes an objective lens compatible with a plurality of optical disks having different specifications.

2. Description of the Related Art

High density recording of information, such as video, audio, and data information, is generally accomplished using various recording mediums, including optical disks, cards and tapes. The optical disk, which is the most commonly used recording medium, is comprised of a plastic or glass medium that has a uniform thickness in a direction axial with an incident reading or writing light, and an information recording surface on which information is recorded. Various types of optical disks have been recently developed and include a laser disk (LD), a compact disk (CD), and a digital versatile disk (DVD). Current commercialized high-density optical disk systems heighten recording density by enlarging a numerical aperture of an objective lens using a short-wavelength light source of 635 nm or 650 nm, for example. As a result, the optical disk system is able to both record and reproduce information from a DVD and reproduce information recorded on a CD, despite the fact that a CD generally does not have the same thickness as a DVD. However, due to recording characteristics of a CD-recordable (CD-R) recording medium, such a high-density digital optical disk system has to use light that has a wavelength of 780 nm in order to use current CD-R mediums having CD patterns. In order to provide compatibility between a DVD and a CD-R medium, it is very important to enable a single optical pickup to use light that has a wavelength of 780 nm and light that has a wavelength of 650 nm.

As a result of changes in the thickness of the optical disk and variations in the wavelength and numerical aperture, optical aberration occurs when an optical disk that does not have the 780 nm and 650 nm specifications is loaded in current high-density optical disk systems. For this reason, intense research is currently taking place to develop an optical pickup that both alleviates optical aberration and is compatible with optical disks that have different respective specifications. As a result, optical pickup devices that are compatible with optical disks that have different respective specifications are being manufactured.

A conventional optical pickup which is compatible with a DVD and a CD-R medium will be described below with reference to FIG. 1.

FIG. 1 illustrates an existing optical pickup that uses a conventional objective lens. The optical pickup illustrated in FIG. 1 uses a laser light having a wavelength of 635 nm during reproduction of a DVD 8, and uses a laser light having a wavelength of 780 nm during recording and reproduction of a CD-R medium 9. The laser light that has a wavelength of 635 nm is emitted from a light source 1, such as a laser diode, incident to a collimating lens 2. The laser light beams from the light source 1 are illustrated by solid lines in FIG. 1. The collimating lens 2 makes the incident light parallel light. The parallel light that passes through the collimating lens 2 is reflected by a polarization beam splitter 3, and then proceeds to an interference filter type prism 4.

At the same time, light having a wavelength of 780 nm is emitted from a light source 11, such as a laser diode, and passes in turn through a collimating lens 12, a beam splitter 13 and a converging lens 14. The light then proceeds to the prism 4. The laser light beams from the light source 11 are illustrated by dotted lines. The prism 4 totally transmits the light that has a wavelength of 635 nm which is incident after being reflected by the polarization beam splitter 3, and totally reflects the light that has a wavelength of 780 nm which is converged by the converging lens 14. As a result, the light emitted from the light source 1 is incident to a wave plate 5 in the form of parallel light formed by the collimating lens 2, and the light emitted from the light source 11 is incident to the wave plate 5 in the form of diverging light formed by the converging lens 14 and the prism 4. The light transmitting the wave plate 5 is incident to an objective lens 7 after passing through a thin-film type variable iris 6.

During recording and reproduction of information on the DVD 8, which typically has a thickness of 0.6 mm, light having a wavelength of 635 nm passes through the variable iris 6 and is focused by the objective lens 7 on an information recording surface of the DVD 8. As a result, the light reflected from the information recording surface of the DVD 8 contains the information recorded on the information recording surface. The reflected light transmits through the polarization beam splitter 3 and is detected by an optical detector 10.

The objective lens 7 also focuses the light having a wavelength of 780 nm that has passed through the variable iris 6 onto the information recording surface of the CD-R medium 9, which typically has a thickness of 1.2 mm. However, spherical aberration occurs due to the different thicknesses of the DVD 8 and the CD-R medium 9, which causes the information recording surface of the CD-R medium 9 to be located further from the objective lens 7 along its optical axis than the information recording surface of the DVD 8. When the variable iris 6 is used, which will be described later in reference to FIG. 2, the light that has a wavelength of 780 nm forms an optimal-sized optical spot on the information recording surface of the CD-R medium 9. The light that has a wavelength of 780 nm reflected from the CD-R medium 9 is reflected by the beam splitter 13 and is then detected by an optical detector 15.

The variable iris 6 of FIG. 1 has a thin-film type structure which can selectively transmit the light incident to an area identical to a diameter of the objective lens 7. For example, as illustrated in FIG. 2, the area has a numerical aperture (NA) not more than 0.6. The variable iris 6 is segmented into a first area 1 which transmits both the light having a wavelength of 635 nm and the light having a wavelength of 780 nm, and a second area 2 which totally transmits the light having a wavelength of 635 nm and totally reflects the light having a wavelength of 780 nm. The first area 1 has a numerical aperture not more than 0.45, and the second area 2 is an outer area of the first area 1. The first area 1 is also formed of a quartz ($SiO_2$) thin film to remove optical aberration occurring in the second area 2, which is formed of a dielectric thin film. Using the variable iris 6, the light having a wavelength of 780 nm that is transmitted through the first area 1 that has a numerical aperture not more than 0.45 forms an optical spot that is appropriate for the information recording surface of the CD-R medium 9. As a result, when a loaded optical disk is changed from a DVD 8 to a CD-R medium 9, the optical pickup of FIG. 1 can be compatibly used with an optimized optical spot.

However, it is necessary for the above-described optical pickup of FIG. 1 to achieve a finite optical system with respect to the light having a wavelength of 780 nm, in order to remove spherical aberration that occurs due to compatibility between the DVD and the CD-R medium. Accordingly, the optical system becomes complicated, making it difficult to assemble optical components. In addition, an optical path difference occurs between the light passing through the first area 1 with a numerical aperture not more than 0.45, and the light passing through the second area 2 with a numerical aperture not less than 0.45, due to a dielectric thin film which is formed in the second area 2 in the variable iris 6. To remove this optical path difference, it is necessary to form a particular optical thin film, such as a quartz thin film, on the first area 1. For this reason, a quartz thin film is formed on the first area 1 and a multi-layered thin film is formed on the second area 2, which causes the manufacturing process to become complicated. In addition, the thickness of the thin film has to be adjusted on a micrometer ($\mu$m) scale, which does not fit mass-production. Even though a direct overwrite technique for performing a reproduction operation at the same time as when performing a recording operation is known which involves a technique, using light beams of different respective wavelengths and a single lens, the known direct overwrite technique cannot be applied to disks of different respective specifications in order to perform recording and reproduction operations.

SUMMARY OF THE INVENTION

To solve the above problems, it is an object of the present invention to provide an optical pickup device that includes an objective lens which is compatible with a plurality of optical disks, using one or more light sources, where a collimating lens and the objective lens are shared along a respective optical path from the light source to the disk.

Additional objects and advantages of the invention will be set forth in part in the description which follows and, in part, will be obvious from the description, or may be learned by practice of the invention.

Objects of the invention are achieved by an objective lens that selectively focuses light emitted from a laser source onto a first optical recording medium and a second optical recording medium that have different thicknesses. The objective lens includes a first lens area that has an aspherical surface to focus light emitted by the laser source onto the first optical recording medium and the second optical recording medium. A second lens area has an aspherical surface to focus light emitted by the laser source onto the second optical recording medium, and a third lens area has an aspherical surface to focus light emitted by the laser source onto the first optical recording medium. The first lens area reduces optical aberration with respect to the first optical recording medium and the second optical recording medium, the second lens area reduces optical aberration with respect to the second optical recording medium, and the third lens area reduces optical aberration with respect to the first optical recording medium.

Further objects of the invention are achieved by an optical pickup device that includes a laser source to selectively emit light onto a first optical recording medium and a second optical recording medium that have different thicknesses. An objective lens having a first lens area, a second lens area, and a third lens area focuses the light emitted from the laser source. The first lens area has an aspherical surface corresponding to the first optical recording medium and the second optical recording medium, the second lens area has an aspherical surface corresponding to the second optical recording medium, and the third lens area has an aspherical surface corresponding to the first optical recording medium.

Further objects of the invention are achieved by an optical pickup device that includes a first optical recording medium and a second optical recording medium having different thickness, and a laser source to emit light that has a first wavelength and a second wavelength that is not equal to the first wavelength. An objective lens of the optical pickup device includes a first lens area, a second lens area, and a third lens area to focus the light emitted by the laser source. The first lens area has a first step difference from the third lens area and a second step difference from the second lens area, and has an aspherical surface corresponding to the first optical recording medium and the second optical recording medium. The second lens area has an aspherical surface corresponding to the second optical recording medium, and the third lens area has an aspherical surface corresponding to the first optical recording medium. An optical detector detects light reflected from the first optical recording medium and the second optical recording medium. The first step difference generates an optical aberration which is an integer multiple of the first wavelength and the second step difference generates an optical aberration which is an integer multiple of the second wavelength.

BRIEF DESCRIPTION OF THE DRAWINGS

The preferred embodiments are described with reference to the drawings wherein.

DETAILED DESCRIPTION OF THE PREFERRED EMBODIMENTS

Preferred embodiments of the present invention will be described in detail with reference to the accompanying drawings.

Figure 1:
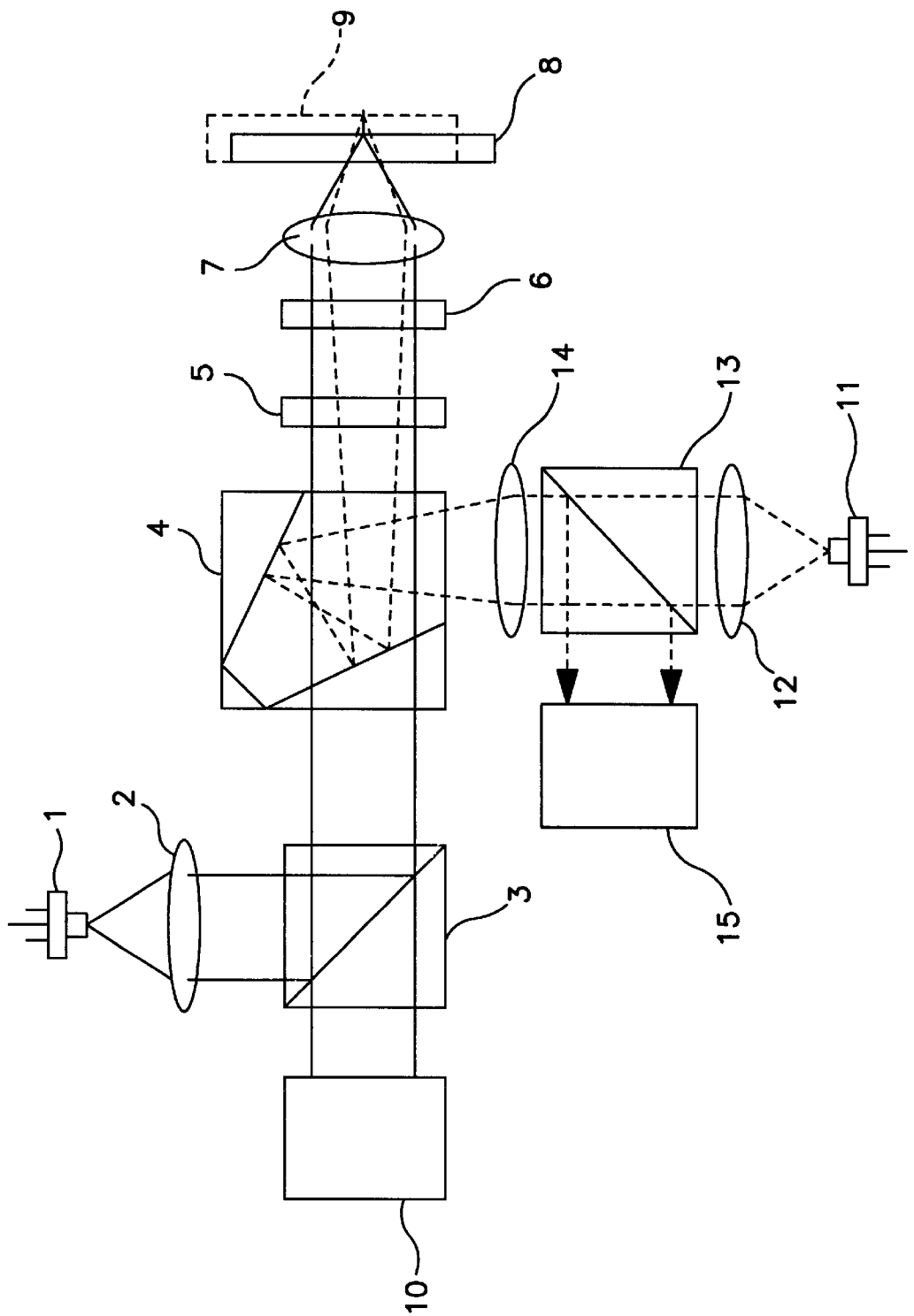
FIG. 1 is a schematic view illustrating a conventional optical pickup which uses a conventional objective lens.
Figure 2:
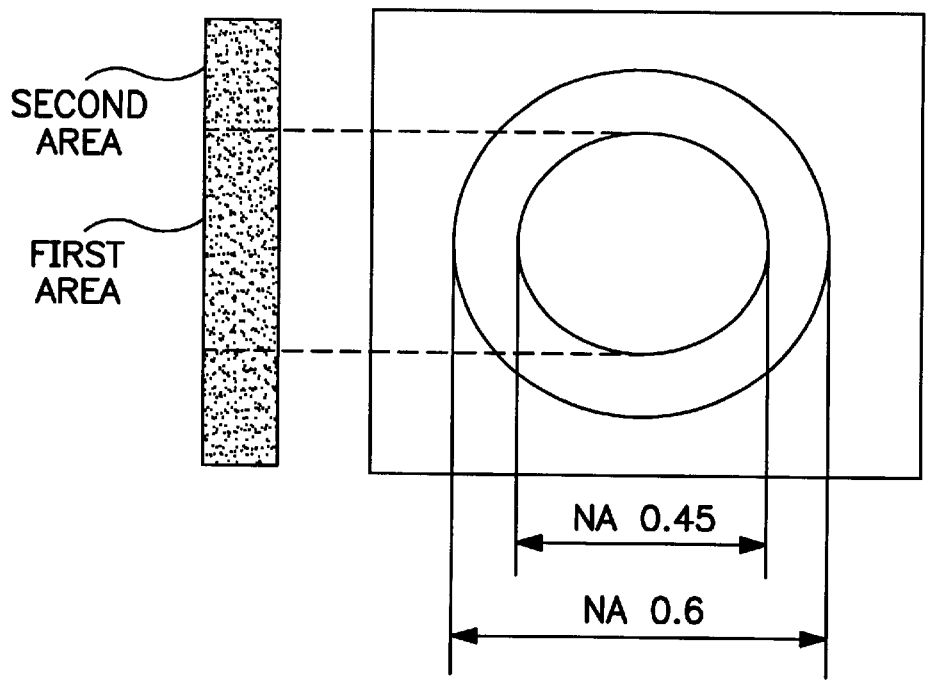
FIG. 2 is a schematic view illustrating a variable iris of the optical pickup of FIG. 1.
Figure 3:
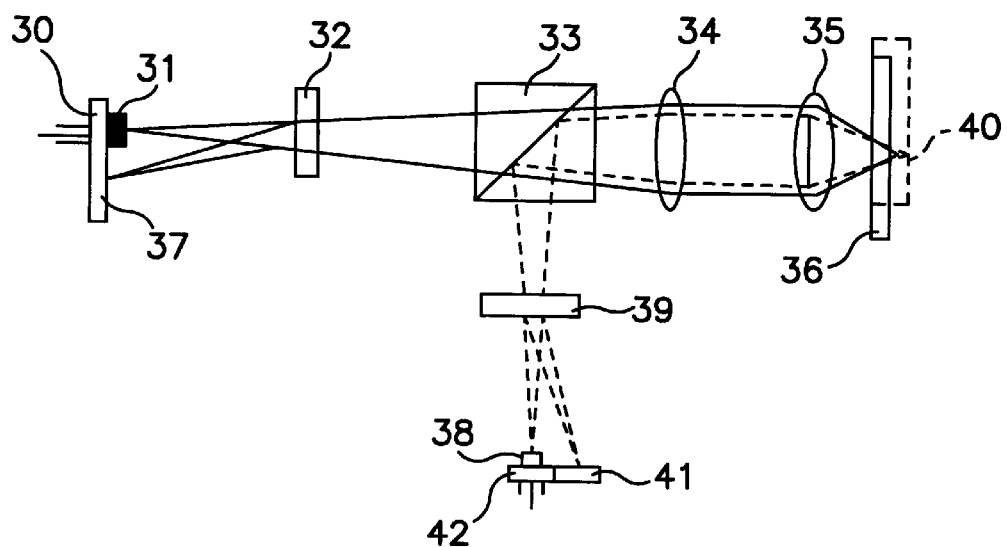
FIG. 3 is a schematic view illustrating an optical pickup including an objective lens according to a preferred embodiment of the present invention.

FIG. 3 illustrates an optical pickup that includes an objective lens according to a preferred embodiment of the present invention. The optical pickup of FIG. 3 includes laser sources 31 and 38, holographic beam splitters 32 and 39, a beam splitter 33, a collimating lens 34, an objective lens 35 and optical detectors 37 and 41. Laser light source 31 and optical detector 37 are integrated into a single unit 30, and laser light source 38 and optical detector 41 are integrated into a single unit 42.

The operation of the optical pickup of FIG. 3 will be described below in connection with an optical recording media, such as a DVD 36 which is a thin disk, and a CD-R medium 40 which is a thick disk with reference to FIGS. 5–8. While a light source that emits light having a wavelength of 635 nm or 650 nm could be used for the DVD, only light having a wavelength of 650 nm is described hereinafter for simplicity.

Figure 6:
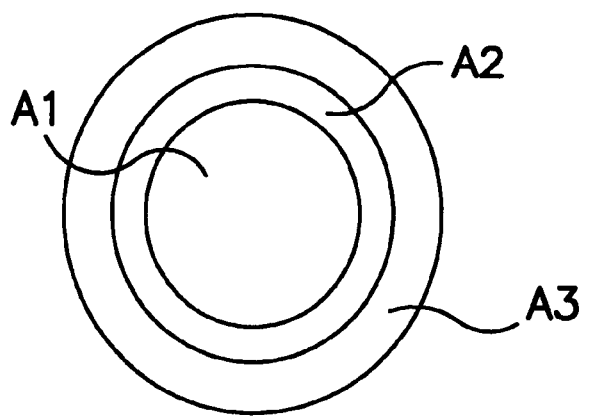
FIG. 6 is a diagram of an objective lens viewed from a light source in which the objective lens is segmented into an inner area, an annular lens area and an outer area.
Figure 7:
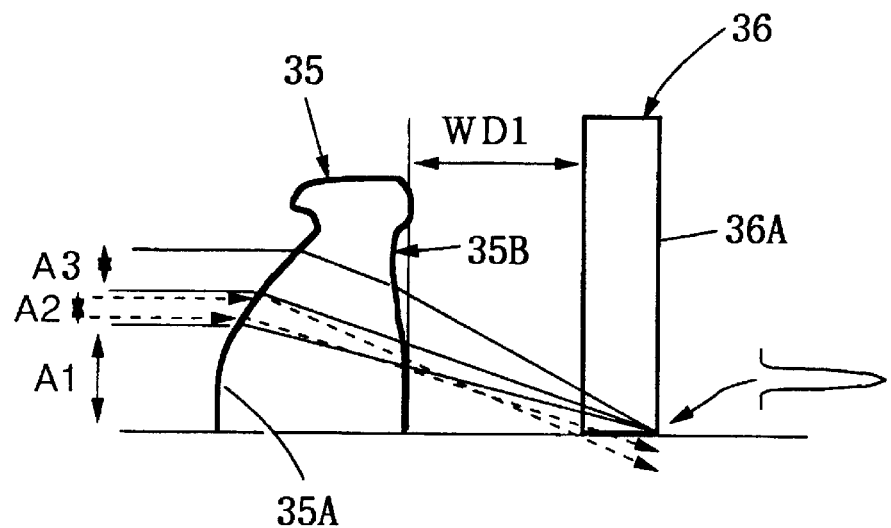
FIG. 7 is a partial schematic view illustrating the objective lens forming an optical spot on an information recording surface of a thin optical disk.

In the optical pickup of FIG. 3, when reproducing information from the DVD 36, a laser light that has a wavelength of 650 nm is emitted from laser source 31 incident to the holographic beam splitter 32. The 650 nm wavelength laser light is depicted by solid lines in FIG. 3. The incident light transmits through the holographic beam splitter 32 and proceeds to the beam splitter 33. The collimating lens 34 collimates the light that passes through the beam splitter 33 in the form of parallel light. The light that passes through the collimating lens 34 is formed as an optical spot on an information recording surface of the DVD 36 by the objective lens 35. This light beam that forms the optical spot on the information recording surface of the DVD 36 is shown as solid lines in FIG. 5. The light reflected from the information recording surface of the DVD 36 passes through the objective lens 35 and the collimating lens 34, and is then incident to the beam splitter 33. The beam splitter 33 transmits the incident light, and the optical path of the transmitted incident light is changed by the holographic beam splitter 32, so that the light that passes through the holographic beam splitter 32 is focused on the optical detector 37. As illustrated in FIGS. 6 and 7, the light that passes through an inner area A1 and an outer area A3 of the objective lens 35 is formed as a spot of a size from which information can be read on the information recording surface 36A of the DVD 36.

Figure 8:
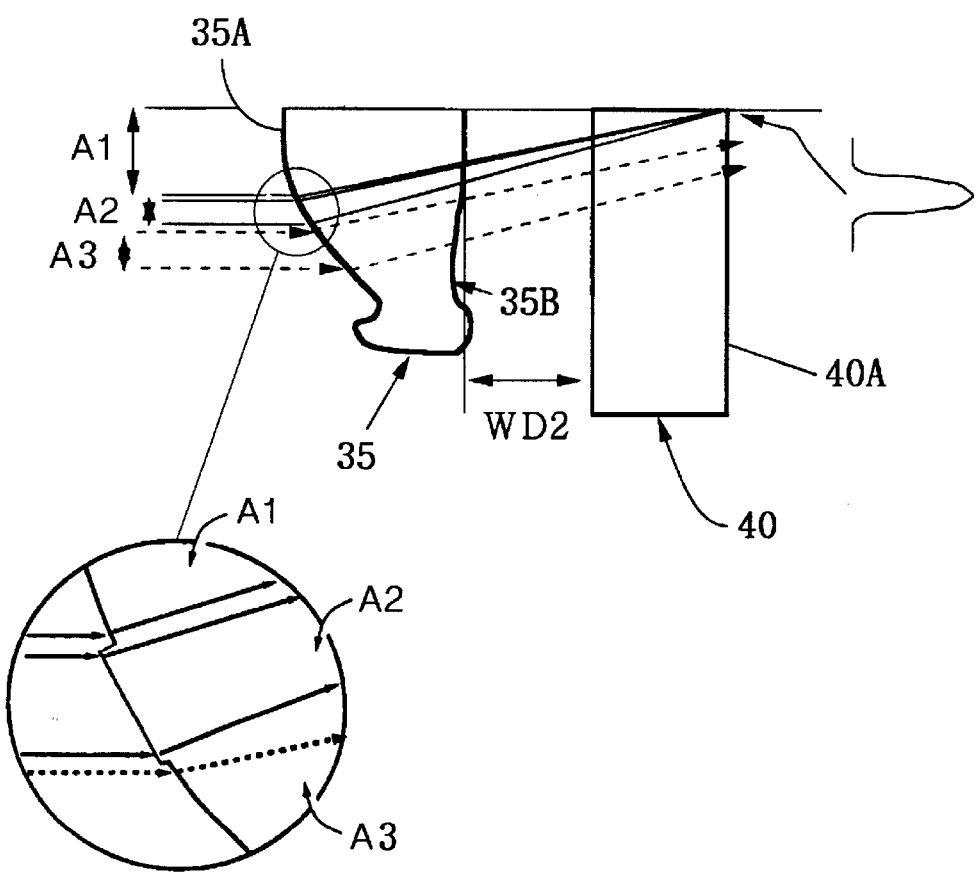
FIG. 8 is a partial schematic view illustrating the objective lens forming an optical spot on an information recording surface of a thick optical disk.

Meanwhile, when reproducing information from CD-R medium 40, the laser light that has a wavelength of 780 nm is emitted from the laser source 38 incident to the holographic beam splitter 39. The 780 nm wavelength light is depicted by dotted lines. The incident light transmits through the holographic beam splitter 39 and proceeds to the beam splitter 33 where it is reflected. The collimating lens 34 collimates the light reflected from the beam splitter 33 in the form of parallel light. The light that passes through the collimating lens 34 is formed as an optical spot on an information recording surface of the CD-R medium 40 by the objective lens 35. The light beam that forms the optical spot on the information recording surface of the CD-R medium 40 is shown as dotted lines in FIG. 5. The light that is reflected from the information recording surface of the CD-R medium 40 is focused on the optical detector 41 by the holographic beam splitter 39. As shown in FIGS. 6 and 8, the light that passes through the inner area A1 and an annular lens area A2 of the objective lens 35 is formed as a spot of a size from which information can be read on the information recording surface 40A of the CD-R medium 40. Therefore, the optical detector 41 detects the light that passes through the inner area A1 and the annular lens area A2 of the objective lens 35.

Figure 4:
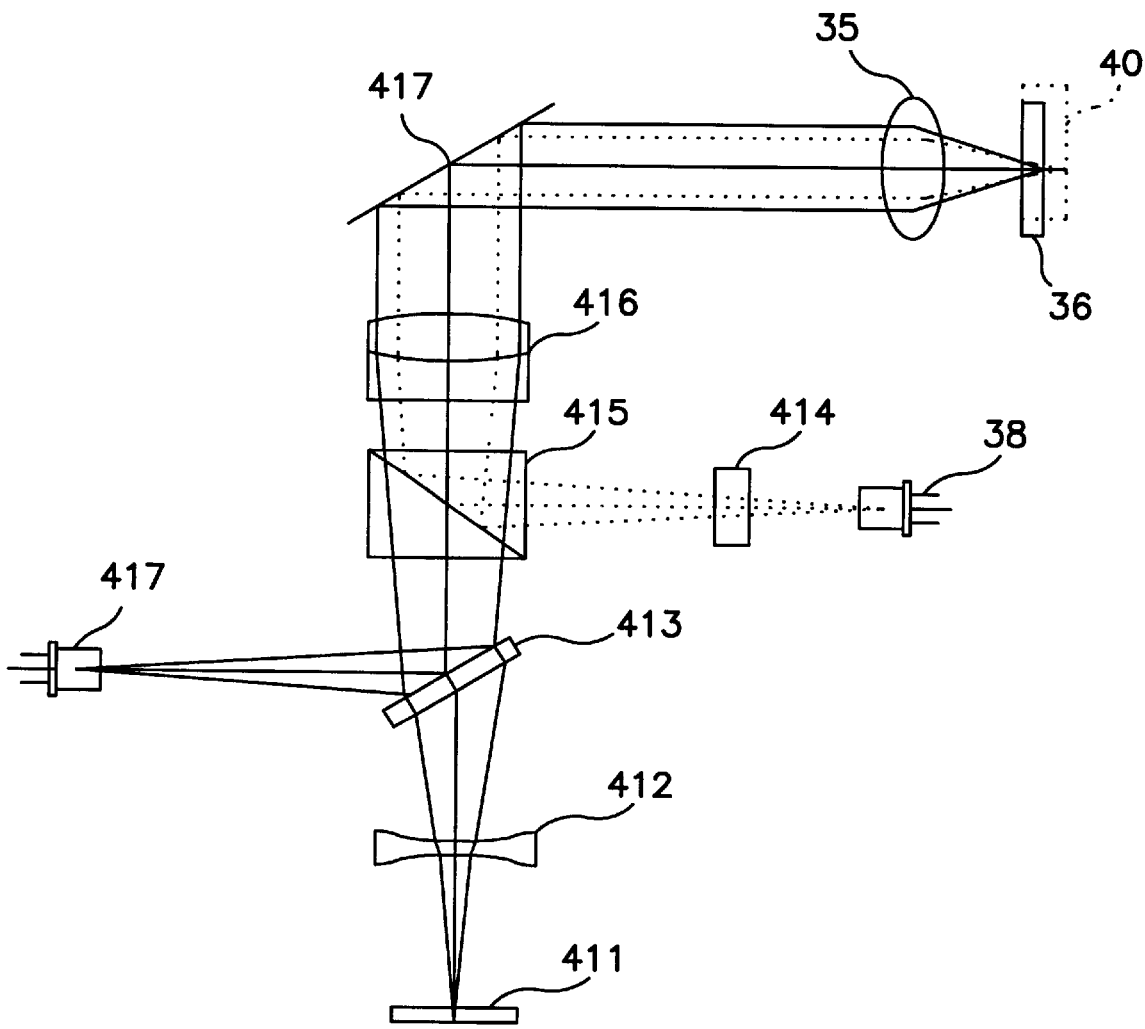
FIG. 4 is a schematic view illustrating an optical pickup including an objective lens according to another embodiment of the present invention.
Figure 5:
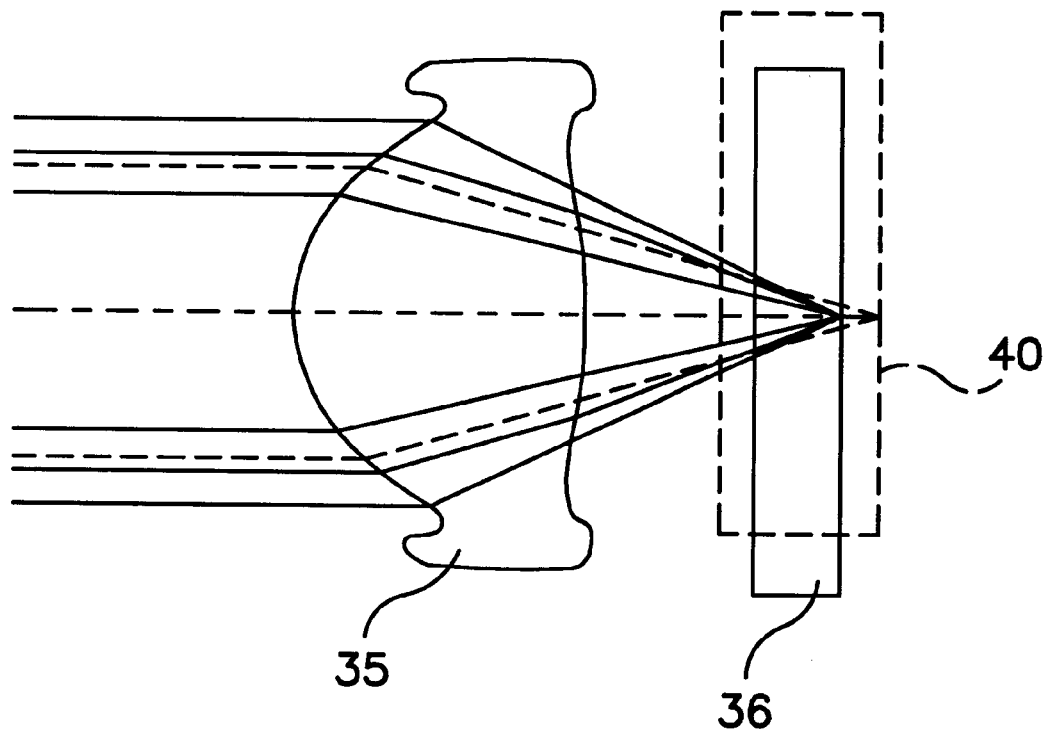
FIG. 5 is a schematic view illustrating the objective lens of FIGS. 3 and 4 forming an optical spot on an information recording surface of a plurality of optical disks.

FIG. 4 is a schematic view illustrating an optical pickup including an objective lens according to another embodiment of the present invention. The optical pickup of FIG. 4 includes laser light sources 31 and 38, beam splitters 413 and 415, a collimating lens 416, a reflective mirror 417 and an objective lens 35. Also, an astigmatic lens 412 is disposed so that the light reflected from the information recording surface of the DVD 36 and CD-R medium 40 is focused onto an optical detector 411. The optical elements of FIG. 4 perform the same functions as those having the same reference numerals as those of FIG. 3.

Referring to FIG. 4, when reproducing information from the DVD 36, the light emitted from the laser light source 31 is reflected from and transmitted through the beam splitters 413 and 415 and passes through the collimating lens 416. The reflective mirror 417 reflects the parallel light from the collimating lens 416 toward the objective lens 35. The objective lens 35 forms an optical spot on the information recording surface of the DVD 36. The light emitted from laser light source 31 is shown as solid lines in FIG. 4. The light that is reflected from the DVD 36 returns to the collimating lens 416 and the beam splitters 415 and 413 and is detected by the optical detector 411.

Meanwhile, when reproducing information from the CD-R medium 40, the light emitted from laser light source 38 is diffracted by a diffractive lattice 414 and reflected from the beam splitter 415. The reflected light passes through the collimating lens 416, the reflective mirror 417 and the objective lens 35, and is formed as an optical spot on the information recording surface of the CD-R medium 40. The optical detector 411 detects the light reflected from the CD-R medium 40.

The objective lens shown in FIG. 3 and 4 will now be described with reference to FIGS. 6, 7 and 8.

FIG. 6 illustrates a lens surface of the objective lens 35 that is viewed from a light source in which a lens surface 35A of the objective lens 35 illustrated in FIGS. 7 and 8 is segmented into an inner area A1, an annular lens area A2 and an outer area A3. FIG. 7 illustrates optical paths when a working distance of the objective lens 35 is WD1 for reproduction of the DVD 36. FIG. 8 shows optical paths when a working distance of the objective lens 35 is WD2 for reproduction of the CD-R medium 40.

As shown in FIG. 6, the objective lens 35 is segmented into three areas A1, A2 and A3. The inner area A1 is formed so that minimum optical aberration is simultaneously satisfied for recording and reproduction of the information with respect to a DVD and a CD-R medium. That is, optimized aspherical surfaces are formed on the objective lens 35 to form the most preferable focal points on information recording surfaces 36A and 40A of the optical disks 36 and 40. The annular lens area A2 is formed to have a minimum optical aberration only with respect to the CD-R medium. That is, an optimized aspherical surface is formed on the annular lens A2 to produce an optimized focal spot on the information recording surface 40A of the CD-R medium 40. Finally, the outer area A3 is comprised of an optimized aspherical surface with respect to the DVD 36. As a result, when reproducing the DVD 36, the light that passes through the inner area A1 and the outer area A3 of the objective lens 35 is detected, as shown by solid lines in FIG. 7, when reproducing the CD-R medium, the light that passes through the inner area A1 and the annular lens area A2 of the objective lens 35 is detected, as shown by solid lines in FIG. 8. In order to form a plurality of lens surfaces of respectively different shapes on an identical lens as described above, the lens surface of the inner area A1 should be primarily worked with a lens data value, the lens surface of the annular lens area A2 should be then worked, and the lens surface of the outer area A3 should be finally worked. As a result, a one step difference is formed between the areas, which causes an optical aberration to occur. To solve this problem, the objective lens 35 according to the preferred embodiments of the present invention is designed so that there is both a step difference between the inner area A1 and the annular lens area A2 of the objective lens 35 when reproducing the CD-R medium, and a step difference between the inner area A1 and the outer area A3 when reproducing the DVD become an integer multiple of the light wavelength. Since the step differences are integer multiples of the light wavelength, optical aberration does not occur. The enlarged portion of FIG. 8 shows a one step difference in each area at the annular lens area A2 of the objective lens 35.

As described above, the optical pickup according to the present invention is compatible with optical disks that have different respective specifications irrespective of the thickness of the disks. Even when two or more kinds of laser light are used, a single objective lens is used to form an optical pickup.

While only certain embodiments of the invention have been specifically described herein, it will be apparent that numerous modifications may be made thereto without departing from the spirit and scope of the invention.

What is claimed is:

1. An objective lens to selectively focus light emitted from a laser source onto a first optical recording medium and a second optical recording medium having different thicknesses, the objective lens comprising:
   a first lens area having an aspherical surface to focus light emitted by the laser source onto the first optical recording medium and the second optical recording medium;
   a second lens area having an aspherical surface to focus light emitted by the laser source onto the second optical recording medium; and
   a third lens area having an aspherical surface to focus light emitted by the laser source onto the first optical recording medium, wherein
      said first lens area reduces optical aberration with respect to the first optical recording medium and the second optical recording medium,
      said second lens area reduces optical aberration with respect to the second optical recording medium, and
      said third lens area reduces optical aberration with respect to the first optical recording medium.

2. The objective lens according to claim 1, further comprising an optical detector to detect light reflected from the first and the second optical recording medium.

3. The objective lens according to claim 2, wherein
   the light focused by said first lens area and said third lens area is detected by said optical detector in response to the reproduction of information from the first optical recording medium, and
   the light focused by said first lens area and said second lens area is detected by said optical detector in response to the reproduction of information from the second optical recording medium.

4. The objective lens according to claim 1, further comprising
   a first step difference formed between said first lens area and said second lens area, and
   a second step difference formed between the first lens area and the third lens area,
      wherein said first step difference and said second step difference are an integer multiple of a wavelength of the light emitted from the light source.

5. The objective lens according to claim 1, wherein the objective lens is spaced a first distance from the first optical recording medium and a second distance from the second optical recording medium, the second distance not equal to the first distance.

6. The objective lens according to claim 1, wherein said first lens area, said second lens area, and said third lens area are centered about an optical axis of the objective lens.

7. An optical pickup device for recording and/or reproduction of a first optical recording medium and a second optical recording medium having different thicknesses, comprising:
   a laser source to selectively emit light onto the first optical recording medium and the second optical recording medium; and
   an objective lens having a first lens area, a second lens area, and a third lens area to focus the light emitted from said laser source, wherein
      the first lens area has an aspherical surface corresponding to the first optical recording medium and the second optical recording medium,
      the second lens area has an aspherical surface corresponding to the second optical recording medium, and
      the third lens area has an aspherical surface corresponding to the first optical recording medium.

8. The optical pickup device according to claim 7, wherein the first lens area, the second lens area, and the third lens area are centered about an optical axis of objective lens.

9. The optical pickup device of claim 7, wherein
   the first lens area reduces optical aberration with respect to the first optical recording medium and the second optical recording medium,
   the second lens area reduces optical aberration with respect to the second optical recording medium, and
   the third lens area reduces optical aberration with respect to the first optical recording medium.

10. The optical pickup device according to claim 7, further comprising an optical detector to detect light reflected from the first and/or the second optical recording medium.

11. The optical pickup device according to claim 10, wherein
   the light focused by the first lens area and the third lens area is detected by said optical detector during reproduction of information from the first optical recording medium, and
   the light focused by the first lens area and the second lens area is detected by said optical detector during reproduction of information from the second optical recording medium.

12. The optical pickup device according to claim 10, further comprising an astigmatic lens spaced from said optical detector so that the light reflected from the aspherical surfaces is focused onto said optical detector.

13. The optical pickup device according to claim 7, wherein the light emitted from the laser source has a wavelength corresponding to the second optical recording medium, and said objective lens further comprises a step difference formed between the first and the second lens areas that generates an optical aberration that is an integer multiple of the wavelength.

14. The optical pickup device according to claim 7, wherein the light emitted from the laser source has a wavelength corresponding to the first optical recording medium, and said objective lens further comprises a step difference formed between the first and the third lens areas that generates an optical aberration that is an integer multiple of the wavelength.

15. The optical pickup device according to claim 7, further comprising:
   a beam splitter positioned between said laser source and said objective lens to receive the light emitted by said light source; and
   a collimating lens to collimate the light received by said beam splitter to form parallel light and transmit the parallel light to said objective lens.

16. The optical pickup device according to claim 15, further comprising a reflective mirror to reflect the parallel light from said collimating lens toward said objective lens.

17. The optical pickup device of claim 16, further comprising a diffractive lattice to diffract the light emitted from said laser source.

18. An optical pickup device for recording and reproduction of a first optical recording medium and a second optical recording medium having different thickness, the optical pickup device comprising:
   a laser source to emit light having a first wavelength and a second wavelength, the first wavelength not equal to the second wavelength;
   an objective lens that includes a first lens area, a second lens area, and a third lens area to focus the light emitted by said laser source, wherein
      the first lens area comprises a first step difference from the third lens area and a second step difference from the second lens area and having an aspherical surface corresponding to the first optical recording medium and the second optical recording medium,
      the second lens area comprises an aspherical surface corresponding to the second optical recording medium, and
      the third lens area comprises an aspherical surface corresponding to the first optical recording medium; and
   an optical detector to detect light reflected from the first optical recording medium and the second optical recording medium,
   wherein the first step difference generates an optical aberration which is an integer multiple of the first wavelengths, and the second step difference generates an optical aberration which is an integer multiple of the second wavelength.

19. The optical pickup device according to claim 18, wherein the first lens area, the second lens area, and the third lens area are centered at an optical axis of said objective lens.

20. The optical pickup device according to claim 18, wherein
   the light focused by the first lens area and the third lens area is detected by said optical detector in response to reproduction of information from the first optical recording medium, and
   the light focused by the first lens area and the second lens area is detected by said optical detector in response to reproduction of information from the second optical recording medium.

21. The optical pickup device according to claim 18, further comprising an astigmatic lens positioned from the optical detector so that the light reflected from the aspherical surfaces is focused onto said optical detector.

22. The optical pickup device according to claim 18, further comprising:
   a beam splitter positioned between said laser source and said objective lens to receive the light emitted by said light source; and
   a collimating lens to collimate the light received by said beam splitter to form parallel light and transmit the parallel light to said objective lens.

23. The optical pickup device according to claim 22, further comprising a reflective mirror to reflect the parallel light from said collimating lens toward said objective lens.

24. The optical pickup device of claim 23, further comprising a diffractive lattice to diffract the light emitted from said laser source.

* * * * *

UNITED STATES PATENT AND TRADEMARK OFFICE
CERTIFICATE OF CORRECTION

PATENT NO. : 6,285,646 B1
DATED : September 4, 2001
INVENTOR(S) : Jang-Hoon Yoo et al.

It is certified that error appears in the above-identified patent and that said Letters Patent is hereby corrected as shown below:

Column 10,
Line 3, change "wavelengths" to -- wavelength --.

Signed and Sealed this

Twenty-sixth Day of March, 2002

Attest:

*Attesting Officer*

JAMES E. ROGAN
*Director of the United States Patent and Trademark Office*